(12) United States Patent
Sharp

(10) Patent No.: US 9,067,282 B2
(45) Date of Patent: Jun. 30, 2015

(54) REMANUFACTURING CAST IRON COMPONENT WITH STEEL OUTER LAYER AND REMANUFACTURED COMPONENT

(71) Applicant: Caterpillar Inc., Peoria, IL (US)

(72) Inventor: Robert Eugene Sharp, Corinth, MS (US)

(73) Assignee: Caterpillar Inc., Peoria, IL (US)

( * ) Notice: Subject to any disclaimer, the term of this patent is extended or adjusted under 35 U.S.C. 154(b) by 30 days.

(21) Appl. No.: 13/893,839

(22) Filed: May 14, 2013

(65) Prior Publication Data
US 2014/0342187 A1 Nov. 20, 2014

(51) Int. Cl.
| | |
|---|---|
| C23C 24/04 | (2006.01) |
| C23C 4/08 | (2006.01) |
| C23C 4/18 | (2006.01) |
| C23C 28/02 | (2006.01) |
| C23C 4/02 | (2006.01) |
| B23P 6/00 | (2006.01) |
| B32B 15/01 | (2006.01) |
| C23C 4/12 | (2006.01) |

(52) U.S. Cl.
CPC ............... *B23P 6/00* (2013.01); *B32B 15/012* (2013.01); *Y10T 428/12972* (2015.01); *Y10T 428/12937* (2015.01); *Y10T 428/12958* (2015.01); *Y10T 428/12979* (2015.01); *C23C 4/125* (2013.01); *C23C 4/121* (2013.01); *C23C 4/124* (2013.01); *C23C 4/02* (2013.01); *C23C 4/08* (2013.01); *C23C 4/18* (2013.01); *C23C 24/04* (2013.01); *C23C 28/021* (2013.01)

(58) Field of Classification Search
None
See application file for complete search history.

(56) References Cited

U.S. PATENT DOCUMENTS

| | | | |
|---|---|---|---|
| 3,715,790 A * | 2/1973 | Reinberger | 29/888.048 |
| 4,160,048 A | 7/1979 | Jaeger | |
| 4,724,819 A * | 2/1988 | Fleri | 123/668 |
| 5,302,414 A | 4/1994 | Alkhimov et al. | 427/192 |
| 2002/0073982 A1* | 6/2002 | Shaikh et al. | 123/688 |
| 2004/0142109 A1 | 7/2004 | Kaufold et al. | |
| 2011/0138596 A1* | 6/2011 | Namba et al. | 29/402.18 |

FOREIGN PATENT DOCUMENTS

| | | |
|---|---|---|
| DE | 10308563 | 8/2004 |
| EP | 2256227 | 12/2010 |

OTHER PUBLICATIONS

PCT/US2014/036428, International Search Report, Jul. 29, 2014, 4 pages.*
Irissou et al., "Review on Cold Spray Process and Technology: Part I—Intellectual Property," Journal of Thermal Spray Technology, vol. 17(4) Dec. 2008, pp. 495-516.*
DE 10 308 563, English-language machine translation, generated Feb. 25, 2015, 5 pages.*
http://www.supersonicspray.com/en/products?pg:=SE40000, viewed May 9, 2013.
http://supersonicspray.com/uploads/files/SST-TDS-A0017-PR-1_0_1-0211.pdf, viewed May 9, 2013.
http://supersonicspray.com/uploads/files/SST-TDS-A0027-PR-1_0_1-0211.pdf, viewed May 9, 2013.
http://supersonicspray.com/uploads/files/SST_TDS_A0050_PR_1_0_2_0612.pdf, viewed May 9, 2013.
http://supersonicspray.com/uploads/files/SST-TDS-A0071-PR-1_0_1-0211.pdf, viewed May 9, 2013.
http://supersonicspray.com/uploads/files/SST_TDS_A5001_PR_1_0_2-0512.pdf, viewed May 9, 2013.
http://supersonicspray.com/uploads/files/SST-TDS-C0075-PR-1_0_1-0211.pdf, viewed May 9, 2013.
http://supersonicspray.com/uploads/files/SST-TDS-C5003-PR-1_0_1-0211.pdf, viewed May 9, 2013.
http://supersonicspray.com/uploads/files/SST-TDS-G0002-PR-1_0_1-0211.pdf, viewed May 9, 2013.
http://supersonicspray.com/uploads/files/SST-TDS-N0056-PR-1_0_1-0211.pdf, viewed May 9, 2013.
http://supersonicspray.com/uploads/files/SST-TDS-S6001-PR-1_0_1-0211.pdf, viewed May 9, 2013.
http://supersonicspray.com/uploads/files/SST-TDS-Z5001-PR-1_0_1-0211.pdf, viewed May 9, 2013.

* cited by examiner

*Primary Examiner* — William Phillip Fletcher, III
(74) *Attorney, Agent, or Firm* — Finnegan, Henderson, Farabow, Garrett & Dunner, LLP

(57) ABSTRACT

Method of remanufacturing a component comprising: removing a damaged area of a cast iron component, the remaining component constituting a cast iron base; depositing molten particles on the cast iron base to form a pool of agglomerated molten particles, wherein the pool comprises aluminum and at least one of nickel, cobalt, chromium, silicon, or iron; cooling the pool to form a solid intermediate layer; and depositing solid particles on the solid intermediate layer to form an outer layer, wherein the solid particles comprise steel. Additionally, a component comprising: a cast iron base; an intermediate layer covering at least a portion of the cast iron base, wherein the intermediate layer comprises aluminum and at least one of nickel, cobalt, chromium, silicon, or iron; and an outer layer covering the intermediate layer, wherein the outer layer comprises steel.

12 Claims, 4 Drawing Sheets

REMANUFACTURING CAST IRON COMPONENT WITH STEEL OUTER LAYER AND REMANUFACTURED COMPONENT

TECHNICAL FIELD

The present disclosure relates generally to a remanufactured cast iron component and, more particularly, to a remanufactured cast iron component having a steel outer layer.

BACKGROUND

High pressure cold spray can be used to form coating surfaces on substrates. The coating surfaces are formed by colliding particles, often containing metals, with a stationary substrate using a high pressure cold spray apparatus. The collision between the particles and the stationary substrate is substantially inelastic, causing the particles to deform and adhere to the substrate.

High pressure cold spray may be used to form steel coatings on cast iron components by colliding steel particles with a cast iron substrate. The cast iron substrate, however, includes graphite iron flakes that tend to fracture when hit with steel particles in the high pressure cold spray process. Fractures in the graphite iron flakes can result in poor bonding between the resultant steel coating and the iron substrate.

Attempts to prevent fracturing of the graphite iron flakes include mixing copper or aluminum particles with the steel particles in the high pressure cold spray process. Because the copper and aluminum are more malleable than steel, they absorb energy from the collisions between the steel particles and the cast iron substrate, which results in adherence of the steel coating and limited fracturing of the graphite iron flakes.

The resultant coating of steel and copper or aluminum mixture, however, can be prone to corrosion when subjected to caustic solutions that are typically used to clean cast iron components. The copper and aluminum readily oxidize in caustic solution and diminish the integrity of the steel coating.

The component of the present disclosure solves one or more of the problems set forth above and/or other problems in the art.

SUMMARY

In one aspect, the present disclosure is related to a component. The component may include a cast iron base and an intermediate layer covering a least a portion of the cast iron base. The intermediate layer may include aluminum and at least one of nickel, cobalt, chromium, silicon, or iron. The component may also include an outer layer covering the intermediate layer. The outer layer may include steel.

In another aspect, the present disclosure is related to a method of remanufacturing component. The method may include removing a damaged area of a cast iron component, the remaining component constituting a cast iron base. The method may further include depositing molten particles on the cast iron base to form a pool of agglomerated molten particles. The molten particles may include aluminum and at least one of nickel, cobalt, chromium, silicon, or iron. The method may also include cooling the pool to form a solid intermediate layer, and depositing solid particles on the intermediate layer to form an outer layer. The solid particles may include steel.

DETAILED DESCRIPTION

Figure 1:
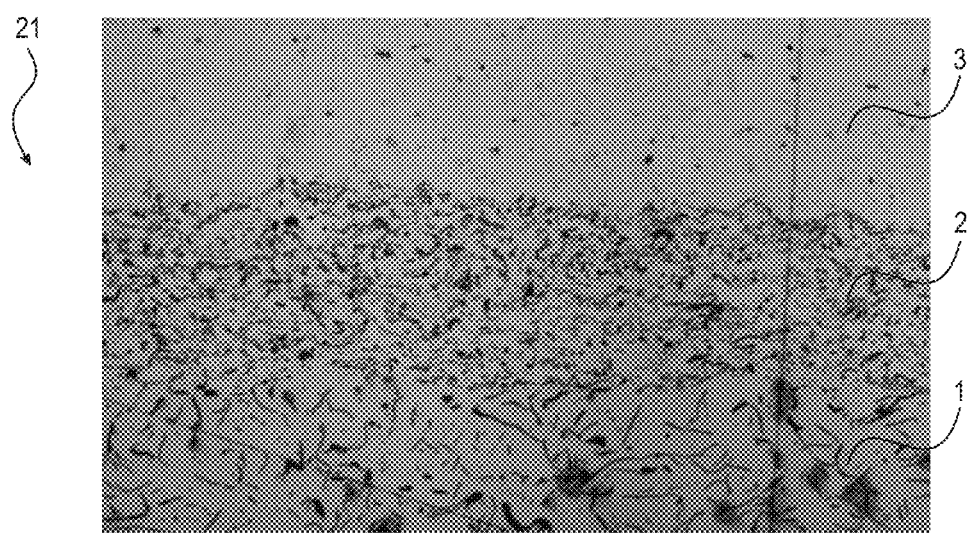
FIG. 1 is a cross-sectional image of an exemplary disclosed component.
Figure 2:
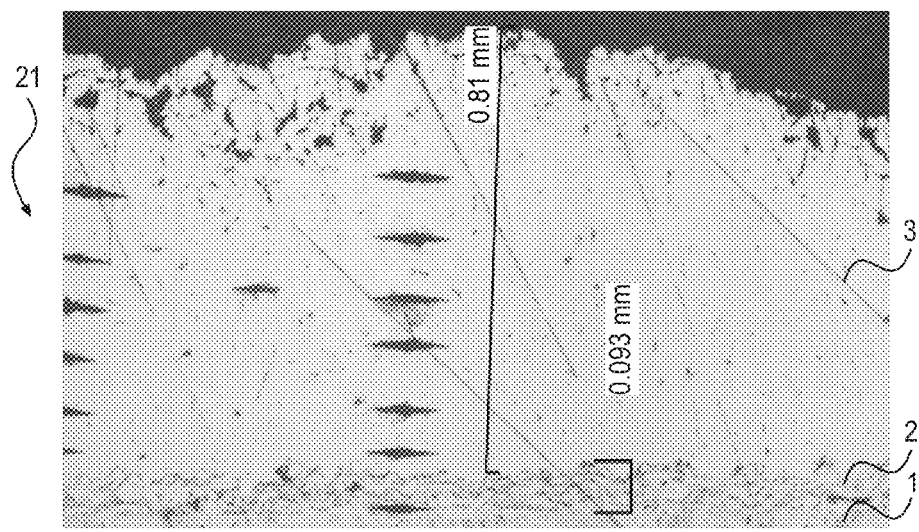
FIG. 2 is another cross-sectional image of an exemplary disclosed component.

FIG. 1 and FIG. 2 each show an exemplary component 21 having a cast iron base 1, an intermediate layer 2, and an outer layer 3, according to the present disclosure. Component 21 may be made of cast iron. For example, component 21 may have a surface consisting essentially of cast iron. In an alternative embodiment, component 21 may have a surface made of any metal, but includes at least an outer surface made of cast iron.

Cast iron base 1 may be made of a cast iron alloy, including at least iron, carbon and silicon. In one embodiment, cast iron base 1 consists of iron and about 2.1 to 4 wt % carbon, and about 1 to 3 wt % silicon. In an alternative embodiment, cast iron base 1 includes grey cast iron consisting of iron and about 2.5 to 4 wt % carbon, and about 1 to 3 wt % silicon.

Intermediate layer 2 may cover at least a portion of cast iron base 1. In one embodiment, intermediate layer 2 may cover portions of cast iron base 1 that include damaged surfaces of the component. In an alternative embodiment intermediate layer 2 may cover an entire cast iron surface of component 21.

Intermediate layer 2 may include aluminum and at least one of nickel, cobalt, chromium, silicon, or iron. In one embodiment, intermediate layer 2 consists essentially of aluminum, iron and chromium. In a further embodiment, intermediate layer 2 consists essentially of about 6% aluminum, about 19% chromium, and about 76% iron. In an alternative embodiment, intermediate layer 2 consists essentially of aluminum and nickel. In a further embodiment, intermediate layer 2 consists essentially of about 5-10% aluminum, and about 90-95% nickel.

Intermediate layer 2 may have a thickness sufficient to inhibit fracturing of graphite iron flakes in cast iron base 1 when outer layer 3 is deposited during a high pressure cold spray process. In one embodiment, intermediate layer 2 has a thickness of about 50 μm to 2000 μm. In another embodiment, intermediate layer 2 has a thickness of about 100 μm to 1000 μm.

Outer layer 3 may cover intermediate layer 2 and include, among other things, steel. For example, outer layer 3 may include tool steel, carbon steel, or stainless steel. In one embodiment, outer layer 3 includes tool steel having iron and a weight percent composition of about 1.6% carbon, about 0.3% manganese, about 4.0% chromium, about 5.0% cobalt, about 4.9% vanadium, about 12.0% tungsten, about 0.3% silicon, and about 0.06% sulfur. In an alternative embodiment, outer layer 3 includes steel having iron and a weight percent composition of about 0.20 to 0.45% carbon, about 0.4 to 1.5% manganese, about 0.5 to 2.0% silicon, about 0.01 to 2.0% chromium, about 0.15 to 1.2% molybdenum, about 0.01 to 0.4% vanadium, about 0.01 to 0.25% titanium, about 0.005 to 0.05% aluminum, about 0.0001 to 0.01% boron, less than about 0.002% oxygen, and about 0.005 to about 0.017% nitrogen. In an alternative embodiment, outer layer 3 includes stainless steel having iron and a weight percent composition of about 0.15% carbon, about 1.0% manganese, about 1.0% silicon, about 11.5 to 13.5% chromium, about 0.04% phosphorus, and about 0.03% sulfur.

Outer layer 3 may have a thickness sufficient to refurbish component 21. In one embodiment, outer layer 3 has a thickness of about 0.1 mm to 60 mm. In another embodiment, outer layer 3 has a thickness of about 2 mm to 10 mm.

INDUSTRIAL APPLICABILITY

The method of remanufacturing a component disclosed below may be used to remanufacture any component having cast iron. The chemical and physical properties of the disclosed component embodiments may provide a number of benefits, including minimal fractures of cast iron flakes during high pressure cold spray application of steel on cast iron. While maintaining corrosion resistance of the outer surface. An exemplary process of manufacturing component 21 will now be discussed in detail.

The process of manufacturing component 21 may include removing, by machining, a damaged area of cast iron component 21, the remaining component constituting cast iron base 1, which may have a substantially uniformly smooth surface. Intermediate layer 2 may be formed on cast iron base 1 by depositing molten particles 12 (FIG. 3) on cast iron base 1 to form a pool 13 of agglomerated molten particles 12. Pool 13 may include aluminum and at least one of nickel, cobalt, chromium, silicon, or iron and may cover at least a portion of cast iron base 1, Pool 13 may be cooled to form a solid intermediate layer 2. Outer layer 3 may be formed by depositing solid particles 20 (FIG. 4) on intermediate layer 2.

Figure 3:
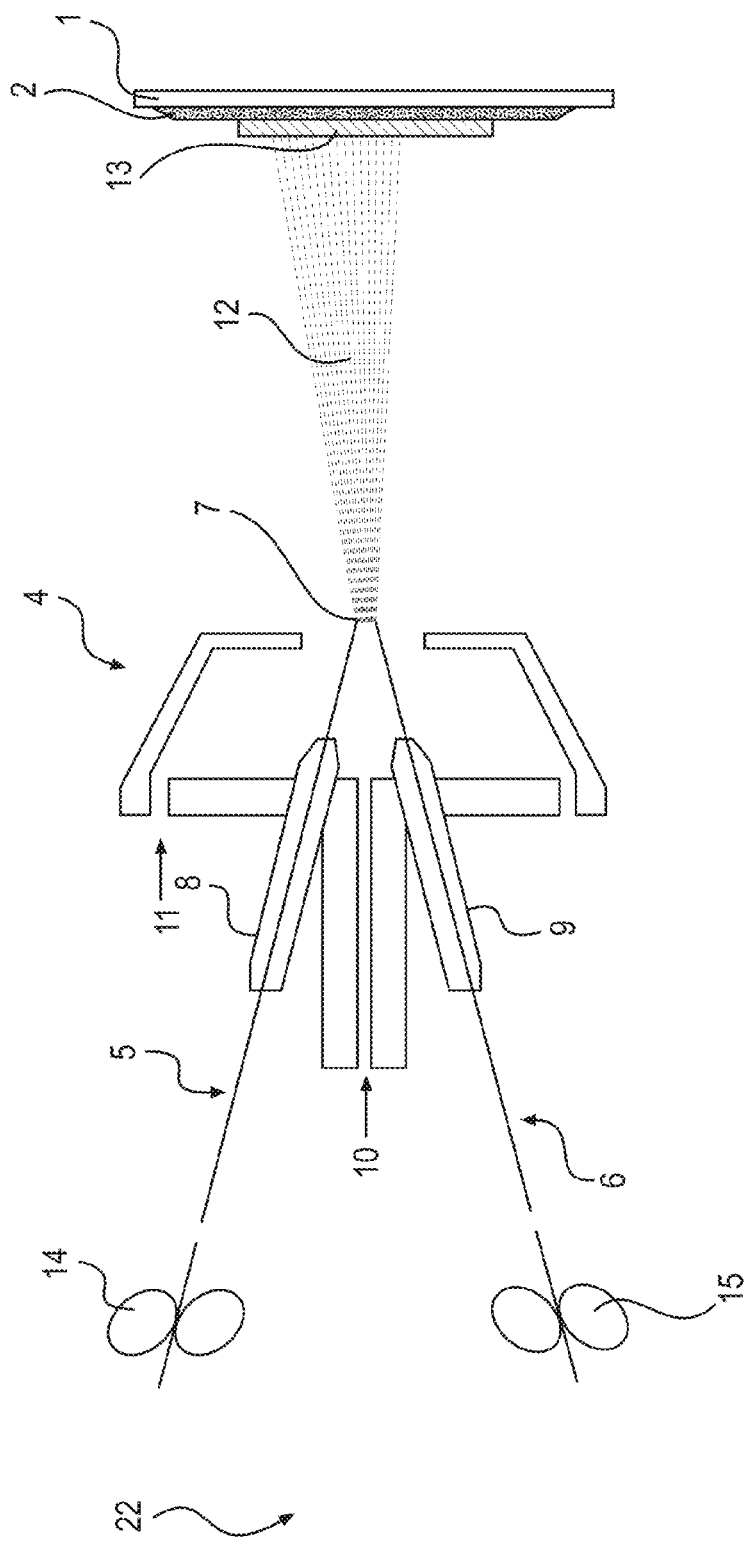
FIG. 3 is a pictorial illustration of an exemplary disclosed twin wire arc spray system that may be used to apply an intermediate layer to a cast iron base.

FIG. 3 shows generally an exemplary twin wire arc spray apparatus 22 that may be used to apply intermediate layer 2 to cast iron base 1. The twin wire arc spray apparatus 22 may include a pistol 4, which may bring together metal wires 5 and 6 at an arc point 7. Wires 5 and 6 may be pushed by rollers 14 and 15 and given opposite electric changes as they pass through contact tubes 8 and 9. When wires 5 and 6 draw near to each other at arc point 7, an electric arc created by the opposing charges may melt the ends of wires 5 and 6. Compressed air may be fed to pistol 4 via conduits 10 and 11 and may atomize the melted ends of wires 5 and 6 at arc point 7, which may generate a flow of molten particles 12 traveling toward cast iron base 1. Molten particles 12 may be deposited on cast iron base 1 and form a pool 13 of agglomerated molten particles 12. Pool 13 may cool and solidify to form intermediate layer 2.

Figure 4:
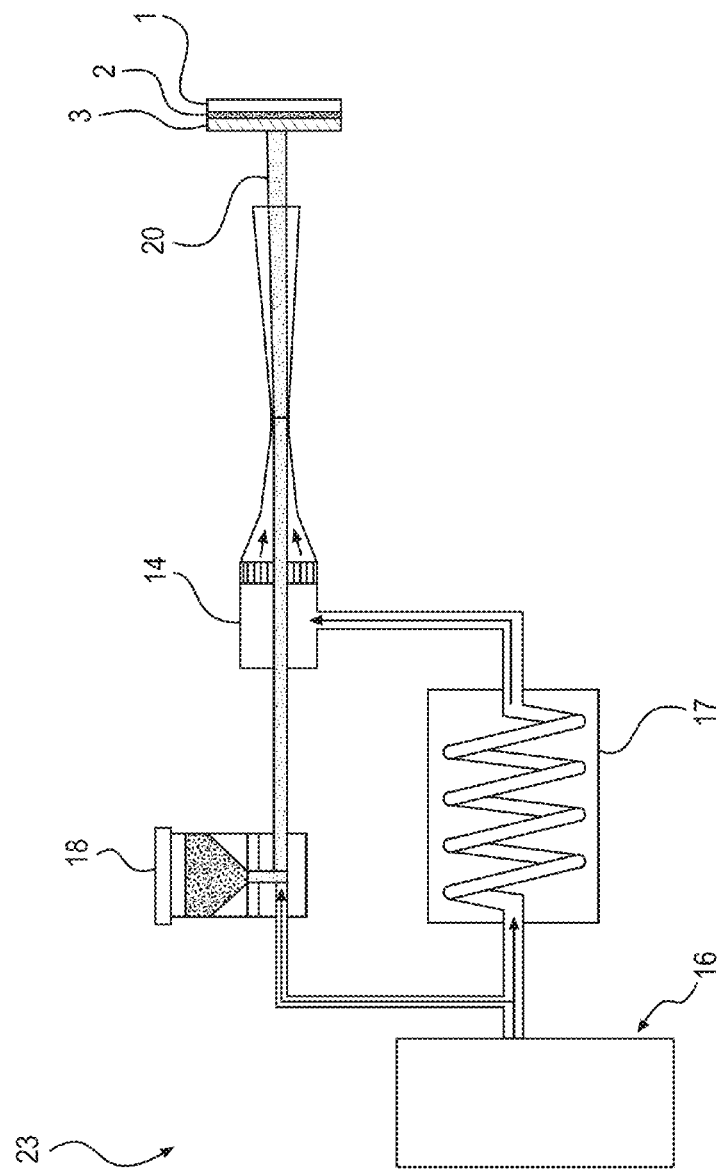
FIG. 4 is a pictorial illustration of an exemplary disclosed high pressure cold spray system that may be used to apply an outer layer to an intermediate layer.

FIG. 4 shows generally an exemplary high pressure cold spray apparatus 23 that may be used to apply outer layer 3 to intermediate layer 2. The high pressure cold spray apparatus 23 may include a gas control module 16, which may provide helium or nitrogen gas to the system at high pressure. Gas may pass from gas control module 16 to a heater 17 and a powder feeder 18. Heated gas from heater 17 and a mixture of gas and solid particles 20 enter nozzle 19. Solid particles 20 may then be deposited on intermediate layer 2 by ejecting solid particles 20 and high pressure gas out of nozzle 19 toward intermediate layer 2 and cast iron base 1. Solid particles 20 may consolidate in solid form on intermediate layer 2 to form outer layer 3. Solid particles 20 may include steel and have an average particle size of about 1 μm to 40 μm. The gas pressure of the system may be sufficient to allow solid particles 20 to travel through nozzle 19 at a velocity of about 1000 m/s to 2500 m/s.

The presently described manufacturing process may be performed to form a remanufactured component with a steel outer layer deposited by high pressure cold spray on a cast iron base that has limited fractures in the cast iron flakes of the base and is not prone to corrosion in a caustic wash. It will be apparent to those skilled in the art that various modifications and variations can be made to the layers of component 21 without departing from the scope of the disclosure. Other embodiments of the layers or method of manufacture of component 21 will be apparent to those skilled in the art from consideration of the specification and practice. It is intended that the specification and examples be considered as exemplary only, with a true scope of the disclosure being indicated by the following claims and their equivalents.

What is claimed is:

1. A method of remanufacturing a component, comprising:
   removing a damaged area of a cast iron component, the remaining component constituting a cast iron base;
   depositing molten particles on the cast iron base to form a pool of agglomerated molten particles, wherein the pool comprises aluminum and at least one of nickel, cobalt, chromium, silicon, or iron;
   cooling the pool to form a solid intermediate layer; and
   depositing solid particles on the solid intermediate layer to form an outer layer, wherein the solid particles comprise steel.

2. The method of claim 1, wherein depositing the molten particles is performed with a twin wire arc spray apparatus.

3. The method of claim 1, wherein depositing the solid particles is performed with a high pressure cold spray apparatus.

4. The method of claim 1, wherein the intermediate layer has a thickness of about 50 μm to 2000 μm.

5. The method of claim 1, wherein the outer layer has a thickness of about 0.1 mm to 60 mm.

6. The method of claim 1, wherein the intermediate layer consists essentially of aluminum, iron, and chromium.

7. The method of claim 6, wherein the intermediate layer consists essentially of about 6% aluminum, about 19% chromium, and about 76% iron.

8. The method of claim 1, wherein the intermediate layer consists essentially of aluminum and nickel.

9. The method of claim 8, wherein the intermediate layer consists essentially of about 5-10% aluminum, and about 90-95% nickel.

10. The method of claim 1, wherein the steel of the outer layer is stainless steel having iron and a weight percent composition of about 0.15% carbon, about 1.0% manganese, about 1.0% silicon, about 11.5 to 13.5% chromium, about 0.04% phosphorus, and about 0.03% sulfur.

11. The method of claim 1, wherein the solid particles have an average particle size of about 1 μm to 40 μm.

12. A method remanufacturing a component, comprising:
   removing a damaged area of a cast iron component, the remaining component constituting a cast iron base;
   depositing molten particles on the cast iron base to form a pool of agglomerated molten particles, wherein the pool comprises aluminum and at least one of nickel, cobalt, chromium, silicon or iron;
   cooling the pool to form a solid intermediate layer, wherein the solid intermediate layer has a thickness of about 50 μm to 2000 μm; and
   depositing solid particles on the solid intermediate layer to form an outer layer, wherein:
   the solid particles comprise steel; and
   the outer layer has a thickness of about 0.1 mm to 60 mm.

* * * * *